UNITED STATES PATENT OFFICE.

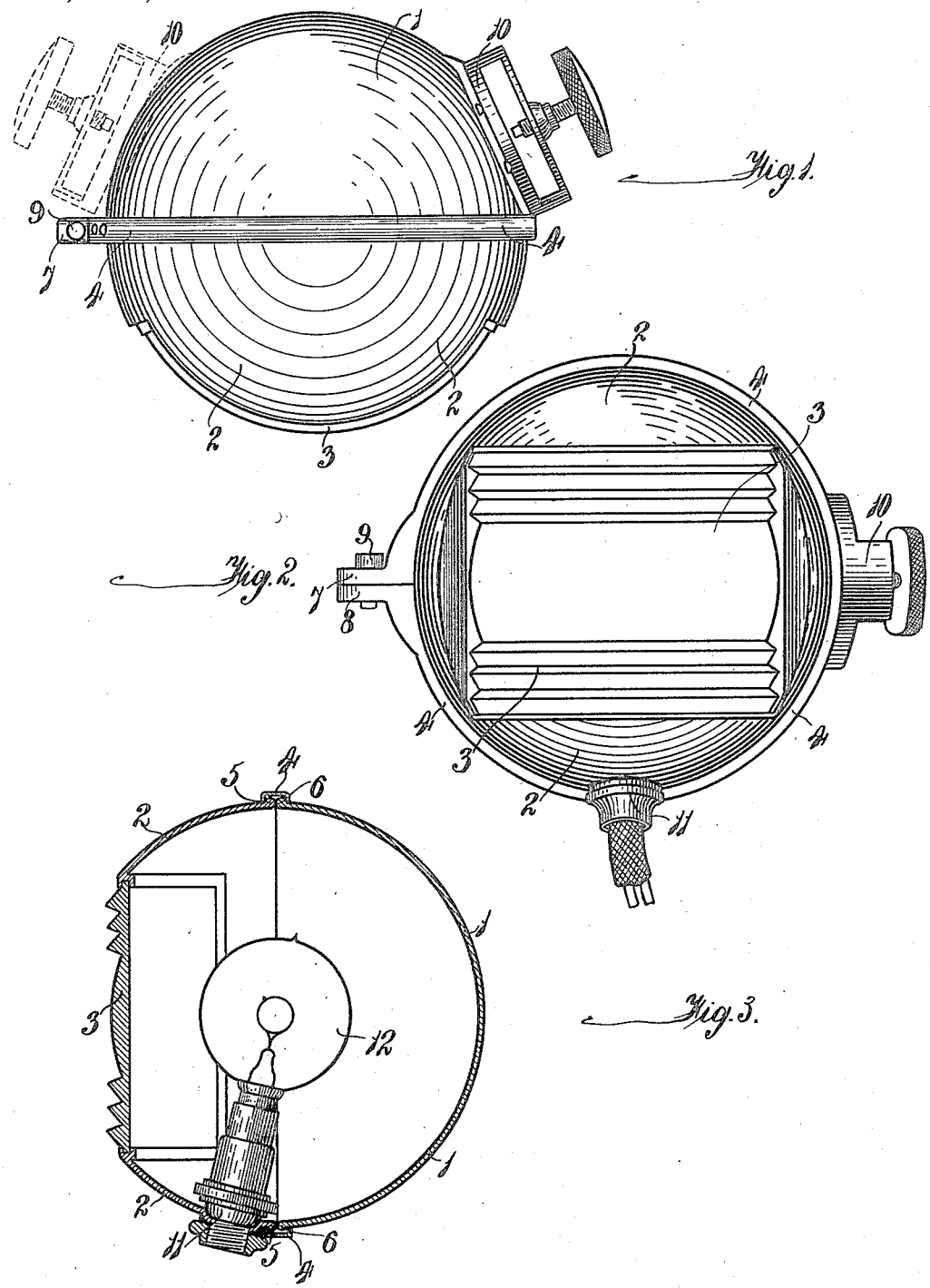

THOMAS LEONARD GRIFFITHS, OF BIRMINGHAM, ENGLAND.

LAMP FOR VEHICLES.

1,152,807.   Specification of Letters Patent.   Patented Sept. 7, 1915.

Application filed April 20, 1914.   Serial No. 833,132.

*To all whom it may concern:*

Be it known that I, THOMAS LEONARD GRIFFITHS, subject of the King of Great Britain, residing at 102 Bradford street, Birmingham, in the county of Warwick, England, have invented a new and useful Improvement in Lamps for Vehicles; and I do hereby declare the following to be a full, clear, and exact description of the same.

This invention relates to lamps for vehicles and more especially to side lamps for motor vehicles. Such lamps as usually made are fitted either to the mud guard or to the side or front of the dashboard, and the rays of light are only directed forward along the road to be traveled. Now when passing objects at night it is of great importance that the driver of a vehicle should be able correctly to judge the distance between the side of his own vehicle and the object to be passed, and for this purpose it is desirable that the side light should have a wide ray in the horizontal plane extending well around to the side of the vehicle. At the same time it is useless to waste the light by allowing it to spread widely in the vertical plane.

An object of my invention is to provide a simple and efficient lamp fulfilling the requirements set forth above.

A further object is to provide a compact lamp which may be used upon either side of the vehicle, the light in each case spreading more to the outside than the front of the road and the front part of the lamp remaining the same way up.

A further object is to provide a compact lamp which may be similarly used upon either side of the vehicle and may be attached either to a vertical or horizontal surface.

The nature of my invention will be more clearly understood by reference to the accompanying drawings forming part of this specification and the accompanying claiming clauses.

Figure 1 is a plan view of one form of lamp made in accordance with this invention adapted for use attached to a horizontal surface on either side of the car the dotted lines representing the position assumed by the attachment fitting when the back part is turned through 180° relatively to the front part. Fig. 2 is a face view. Fig. 3 is a vertical section.

In carrying my invention into practice as illustarted upon the accompanying drawings the lamp is constructed in two parts, the back part 1 being semi-spherical in shape and preferably itself serving to form a semi-spherical reflector. The front part 2 is also preferably semi-spherical in shape with an opening provided of suitable form for receiving the Fresnel lens 3. The two parts are flanged and united by means of a ring 4 of U-section surrounding and inclosing the flanges 5, 6 and adapted to be tightened, loosened, or removed as required; the ring being split and the two ends provided with flanges 7, 8 held by an adjustable screw 9. The lamp is held in position on the vehicle by means of a socket 10 or other suitable fitting secured to the back half of the lamp and engaging with a corresponding fitting on the car. Although it might appear that owing to the direction in which the light is to be thrown it would be necessary to have right-hand and left-hand lamps constructed separately, they are in this form of my invention interchangeable for it is only necessary to fix the back part of the lamp to the car on whichever side it is required, and either way up, since it is semi-spherical and perfectly symmetrical, and then to slacken the fastening ring and to twist the front portion if necessary relative to the back until it occupies the desired position as shown in dotted lines at Fig. 1 when the fastening ring may be tightened up. This further convenience in lamps made in accordance with my invention is particularly applicable to electric lamps; as illustrated a flexible cord passes to the fitting 11 to convey current to the lamp bulb 12 and may be attached to suitable fittings on either side of the car. Clearly however the invention is not confined to lamps of any particular form but is generally applicable to side lamps or the like for vehicles.

The combination of the semi-spherical reflector with the Fresnel lens is particularly suitable in that the light is thrown back by the reflector through the center of the source of light, (supposing the same to be situated at the center of the sphere) and in this manner a concentrated ray is produced, spreading through as wide an angle as may be desired in the horizontal plane, the beams from the two side or head lamps preferably intermingling and giving a light of double intensity immediately in front of the car, and of single intensity around to the side as hereinbefore described, while at the same time the lens concentrates the light so far as concerns the vertical plane, and prevents it from spreading in an unduly wide angle.

Claims.

1. In a lamp for vehicles, the combination of a spherical lamp body comprising a front and a rear portion; a source of light carried upon said front portion; means permitting a relative rotation between the said two portions in the plane of their common boundary; and an attachment fitting adapted to be attached at either side of the vehicle, the rear portion of the lamp being inverted correspondingly and the front portion being adapted to remain the same way up.

2. In a lamp for vehicles, the combination of a spherical lamp body comprising a front and a rear portion; an electric light globe carried by said front portion; electrical connections leading to said front portion; means permitting a relative rotation between the said two portions in the plane of their common boundary; and an attachment fitting adapted to be attached at either side of the vehicle; the rear portion of the lamp being inverted correspondingly and the front portion being adapted to remain the same way up.

3. In a lamp for vehicles the combination of a semi-spherical rear portion; an attachment fitting fixed to said rear portion; a semi-spherical front portion; a lens carried upon said front portion; flanges at the edges of each of said portions; and a ring inclosing the said flanges and permitting the said portions to be rotated relatively one to the other.

4. In a lamp for vehicles the combination of a semi-spherical rear portion; an attachment fitting fixed to said rear portion; a semi-spherical front portion; a Fresnel lens carried upon said front portion; flanges at the edges of each of said portions; a ring inclosing the said flanges and permitting the said portions to be rotated relatively one to the other; a source of light disposed substantially in the center of the sphere; and a semi-spherical reflector formed by the inner surface of the rear portion of the said lamp body.

5. In a lamp for vehicles the combination of a semi-spherical rear portion; a semi-spherical front portion; a Fresnel lens carried upon said front portion; flanges at the edges of each of said portions; a ring inclosing the said flanges and permitting the said portions to be rotated relatively one to the other; and an attachment fitting fixed to said rear portion and adapted to be attached at either side of the vehicle and set at such an angle relatively to the body that the concentrated beam from the lens is adapted to extend from a direction pointing slightly inwardly to an outward direction approximately at right angles to the direction of travel.

6. In a lamp for vehicles the combination of a semi-spherical rear portion; a semi-spherical front portion; a Fresnel lens carried upon said front portion; flanges at the edges of each of said portions; a ring inclosing the said flanges and permitting the said portions to be rotated relatively one to the other; an electric lamp bulb carried by said front portion and disposed substantially at the center of the lamp; a semi-spherical reflector formed by the inner surface of the said rear portion; and an attachment fitting fixed to said rear portion and adapted to be attached at either side of the vehicle and set at such an angle relatively to the body that the concentrated beam from the lens is adapted to extend from a direction pointing slightly inwardly to an outward direction approximately at right angles to the direction of travel.

In testimony whereof, I have signed my name to this specification in the presence of two subscribing witnesses.

THOMAS LEONARD GRIFFITHS.

Witnesses:
HAROLD J. C. FORRESTER,
HERBERT J. O. BARTON.